United States Patent
Hernandez

(10) Patent No.: US 8,172,159 B2
(45) Date of Patent: May 8, 2012

(54) SURFACE TO MOVE A FLUID VIA FRINGE ELECTRIC FIELDS

(75) Inventor: Walter Charles Hernandez, Potomac, MD (US)

(73) Assignee: WCH Technologies, Inc., Potomac, MD (US)

( * ) Notice: Subject to any disclaimer, the term of this patent is extended or adjusted under 35 U.S.C. 154(b) by 1178 days.

(21) Appl. No.: 11/979,585

(22) Filed: Nov. 6, 2007

(65) Prior Publication Data
US 2008/0107542 A1    May 8, 2008

Related U.S. Application Data

(60) Provisional application No. 60/857,184, filed on Nov. 7, 2006.

(51) Int. Cl.
*B05B 12/02* (2006.01)

(52) U.S. Cl. ............ 239/3; 15/1.51; 34/250; 204/230.5; 417/48

(58) Field of Classification Search ............... 15/1.51; 134/1; 34/250; 137/13; 205/742, 919; 204/230.5; 239/3; 244/129.3, 121; 417/50, 48
See application file for complete search history.

(56) References Cited

U.S. PATENT DOCUMENTS

| | | | |
|---|---|---|---|
| 3,095,163 A | 6/1963 | Hill | |
| 3,289,060 A | 11/1966 | Rubin | |
| 3,778,678 A | 12/1973 | Masuda | |
| 4,896,174 A | 1/1990 | Stearns | |
| 6,596,143 B1 | 7/2003 | Wang et al. | |
| 6,911,132 B2 | 6/2005 | Pamula et al. | |
| 6,911,593 B2 | 6/2005 | Mazumder et al. | |
| 7,063,778 B2 | 6/2006 | Mpholo et al. | |
| 7,147,763 B2 | 12/2006 | Elrod et al. | |
| 7,255,780 B2 | 8/2007 | Shenderov | |
| 7,258,774 B2 | 8/2007 | Chou et al. | |
| 2005/0200289 A1 | 9/2005 | Krichtafovitch | |
| 2006/0098290 A1 | 5/2006 | Fernando et al. | |
| 2006/0102525 A1 | 5/2006 | Volkel et al. | |
| 2006/0226266 A1 | 10/2006 | Russel et al. | |

FOREIGN PATENT DOCUMENTS

| | | |
|---|---|---|
| JP | 6-1205 | 1/1994 |
| JP | 07-156755 A | 6/1995 |

OTHER PUBLICATIONS

Translation of Kawamura (JP H01-122755, A).*
PCT/US2007/023301 Search Report dated May 21, 2008.
Chen et al., "Electrowetting-Based Microfluidic Devices: Design Issues", 2003 Summer Bioengineering Conference, Jun. 25-29, pp. 1241-1242.

(Continued)

*Primary Examiner* — J. Christopher Ball
(74) *Attorney, Agent, or Firm* — Katten Muchin Rosenman LLP

(57) ABSTRACT

Macroscopic volumes of fluid can be moved across a surface, including windshields, without mechanical assistance. Insulated electrodes, which for windshields and windows are preferably transparent, are embedded in the surface of the windshield. Varying voltages are supplied to the electrodes to generate intense surface fringe electric fields moving in a given direction across the surface. The intense surface fringe electric fields exert strong electrical forces on the polar molecules of the fluid. These forces move the fluid in specific directions dependent on the geometry of the electrode array and the manner in which voltage is applied to each electrode within an array of electrodes.

29 Claims, 8 Drawing Sheets

OTHER PUBLICATIONS

Gunji et al., "Self-propulsion of a water droplet in an electric field", *J. Phys. D: Appl. Phys.* 38, 2005, pp. 2417-2423.

Srinivasan et al., "A Digital Microfluidic Biosensor for Multianalyte Detection", Dept. of Electrical Engineering, Duke University, 2003 IEEE, pp. 327-330.

Torkkeli, "Droplet microfluidics on a planar surface", VTT Publications 504, 2003, pp. 3, 68-72.

"Microfluidic Systems", from the internet Oct. 31, 2006 http://www.physics.ubc.ca/ssp/research/microfluidic.htm, pp. 1-7.

Armani et al, "Control of Microfluidic Systems: Two Examples, Results, and Challenges", Aerospace Engineering/Bio-Engineering, University of Maryland, pp. 1-21.

"Digital Microfluidics", Duke University, from the internet Dec. 8, 2006 http://www.ee.duke.edu/research/microfluidics/, pp. 1-3.

Cooney et al., "Electrowetting droplet microfluidics on a single planar surface", *Microfluid Nanofluid*, 2006, 12 pages.

Pollack et al, "Electrowetting-based actuation of droplets for integrated micrufluidics", Advance Article published on the web, Mar. 2002, 6 pages.

\* cited by examiner

SURFACE TO MOVE A FLUID VIA FRINGE ELECTRIC FIELDS

The present application claims priority from U.S. Provisional Application No. 60/857,184, entitled "ELECTRONIC WINDSHIELD WIPERS" to Walter C. Hernandez, filed Nov. 7, 2006, the entirety of which is expressly incorporated herein by reference.

BACKGROUND OF THE INVENTION

1. Field of the Invention

The present invention relates to movement of liquids. More particularly, it relates to the movement of large volumes of liquids across a surface.

2. Background of Related Art

Mechanical windshield wipers have become a standard feature on automobiles long ago. Some windshield wipers even start automatically for a driver, giving drivers little reason to even think about their operation. However, when the rubber for a wiper mechanism dries out, a driver is reminded of their existence through noise and less than optimal clearing.

The mechanical windshield wiper was invented by Mary Anderson in 1903, to which a U.S. Pat. No. 743,801 was awarded in September 1905. The '801 patent used manual power to push a wiper mechanism across a windshield to clear rainwater.

The current state of the art for windshield wiper technology relies on electric motors. However, the basic mechanism for pushing a wiper mechanism across a windshield to clear rainwater has changed very little since 1903. Conventional windshield wiper technology has its drawbacks including, e.g., clearing of less than a total windshield area, reliance on a wiper blade that is subject to deterioration, noise, etc.

In recent years, droplets of water and other small amounts of fluids have been moved by an electric field via electrode type devices using common PC board and semiconductor technology. Commonly referred to as microfluidics, the objective has been to manipulate individual droplets (microliter and nanoliter volumes). Key application areas have been biochips, DNA microarrays, continuous-flow microfluidics, including mechanical micropumps and other biochemical analyses. Another application is digital droplet based microfluidics, including electrowetting-on-dielectric (EWOD). All these applications of moving a fluid with an electric field are aimed at manipulating very small droplet volumes of fluid.

SUMMARY OF THE INVENTION

In accordance with the principles of the present invention, a device for moving a macro-volume of fluid across a surface, comprises an array of electrodes to form a moving electric field on the surface. A motivator is used to selectively apply varying voltages to selected electrodes within the array of electrodes, the voltage forming the moving electric field on the surface. The moving electric field moves the macro-volumes of fluid across the surface.

A method of moving a macro-volume of fluid across a surface in accordance with another aspect of the present invention comprises providing an array of electrodes. Varying voltages are applied to the electrodes within the array of electrodes, the varying voltages forming a moving electric field on the surface. The macro-volume of fluid is moved across the surface with the moving electric field.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The Applicant has appreciated the advantages of a system that is able to move large volumes of fluid across a windshield without having the drawbacks associated with a mechanical windshield wiper.

In accordance with the principles of the present teachings, a windshield wiping system is disclosed that has no moving parts. Fluid, e.g., water, cleaning agent, grime, etc., can be removed from a windshield through the use of electric fields that provide electric forces against the fluid. The electric fields can be produced within the fluid to hold and move the fluid about the windshield as desired. In this manner, the fluid can be moved off of the windshield without the deficiencies associated with a mechanical windshield wiper system.

In accordance with the principles of the present teachings, an array of electrodes can be incorporated within a windshield. Individual electrodes from the array of electrodes can be selectively activated to form localized electric fields around the activated electrodes. The localized fields can draw any fluid near the activated electrodes to form a band of fluid. The band or cylinder of fluid can be moved along the windshield by selectively activating and deactivating electrodes within the array of electrodes to pull the fluid in a desired direction. In this manner the fluid can be removed from the windshield without the drawbacks associated with a mechanical windshield wiper.

Figure 1:
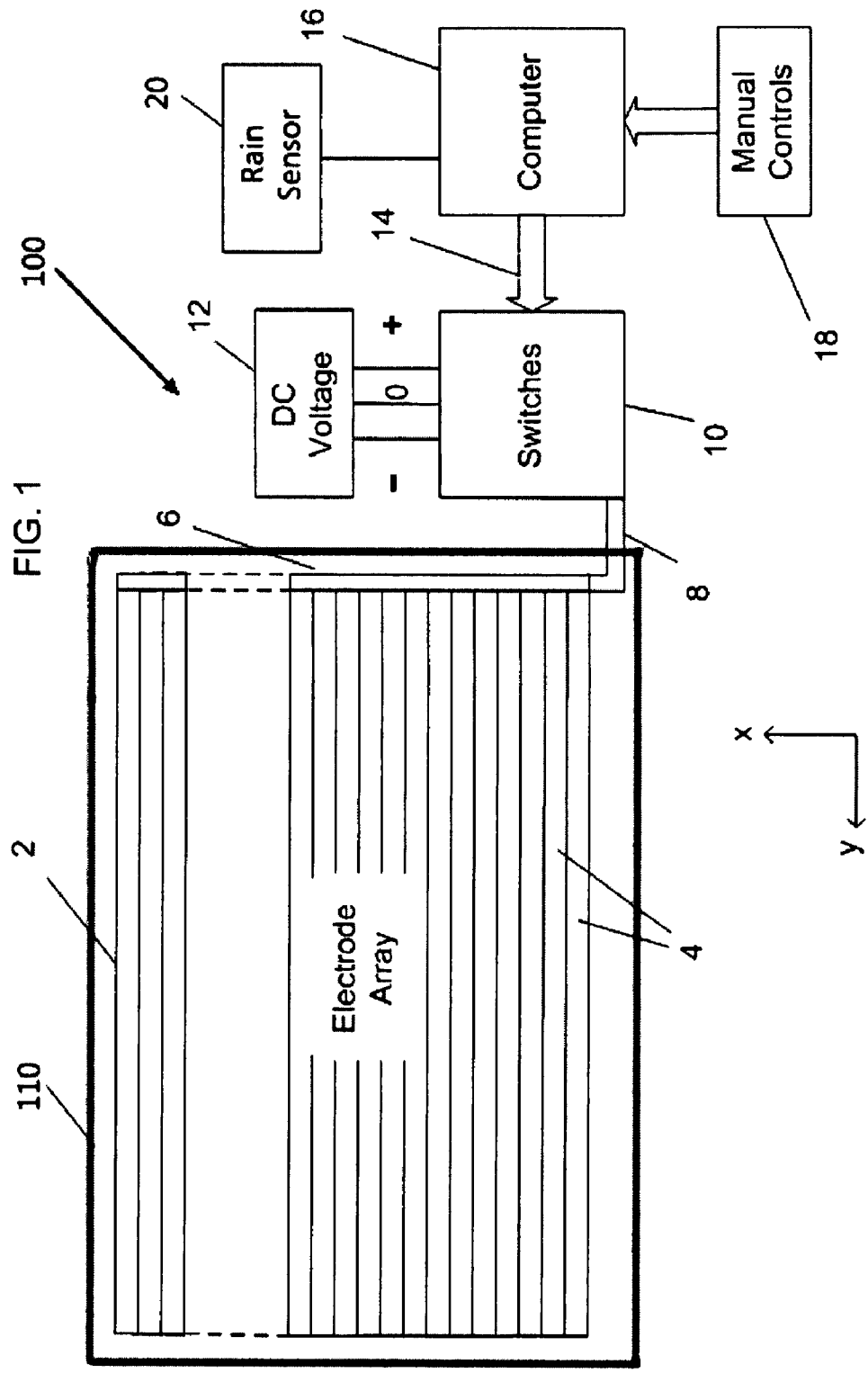
FIG. 1 illustrates a system level view of a fluid movement apparatus, in accordance with the principles of the present invention.

FIG. 1 illustrates a system level view of a fluid movement apparatus, in accordance with the principles of the present invention.

In particular, a fluid movement apparatus 100 can include an electrode array 2 comprised of n parallel electrodes 4, a connector 6, a DC voltage bus 8 comprised of a plurality of pins (the pins are not shown for simplicity of illustration only), and a DC voltage source 12. The fluid movement apparatus 100 can further include a set of switches 10, a control bus 14, a computer 16, manual controls 18, and an optional rain sensor 20. The operating DC voltage may be a fairly low voltage (50 volts) or a high voltage (10,000 volts) depending on parameters of the design. Hence, all components (busing, connectors, switches, etc.) must be insulated properly for the operating voltage.

The electrode array 2 can be comprised of n parallel electrodes 4 of width w which are imbedded in the non-conducting surface on which fluid will be moved or controlled, such as the disclosed windshield 110. For illustrative purposes the electrode width is shown as fairly wide, but in practice will generally be much smaller. The electrodes 4 can be comprised of any transparent conductor, e.g., indium tin oxide (ITO), that allows for the windshield 110 to remain transparent. The electrodes 4 can be comprised of a conductor, a semiconductor, or a combination thereof.

The connector 6 provides an easily detachable interface between the electrode array 2 and the DC voltage bus 8. Such a connector 6 can be any connector that is commonly used within the automobile industry for high voltage connection of components within an automobile.

The computer 16 can selectively activate individual switches (not shown for simplicity of illustration only) within the set of switches 10 to activate individual electrodes 4 within the electrode array 2. The activation of an individual switch within the set of switches 10 allows voltage from the DC voltage source 12 to be applied in an individual electrode 4 over the DC voltage bus 8. The activation of the electrodes 4 within the electrode array 2 to move fluid across the windshield 110 will be described in more detail below with relation to the discussion of FIGS. 3-5.

Manual controls 18 allow an operator of a vehicle to change the operating parameters of the system. For example, as with a conventional manual control for a windshield wiper system, the manual control 18 can allow an operator to turn the fluid movement apparatus 100 on and off, and adjust the speed at which the fluid movement apparatus 100 may activate the electrodes 4 to move fluid across the windshield 110 and/or to activate a cleaning (scrubbing) cycle.

The optional rain sensor 20 can detect the existence of fluid and the amount of fluid on the windshield 110. The rain sensor 20 can activate the fluid movement apparatus 100 to begin movement of a fluid across the windshield 110. Depending up the amount of fluid detected by rain sensor 20, more or less electrodes 4 can be activated by computer 16.

The number of electrodes 4 that make up the electrode array 2 is a function of the size of the windshield 110. For example, the number of electrodes 4 that would be incorporated into a windshield 110 for a small automobile would be much less than the number of electrodes 4 that would be incorporated into a windshield 110 for a large automobile.

Figure 2:
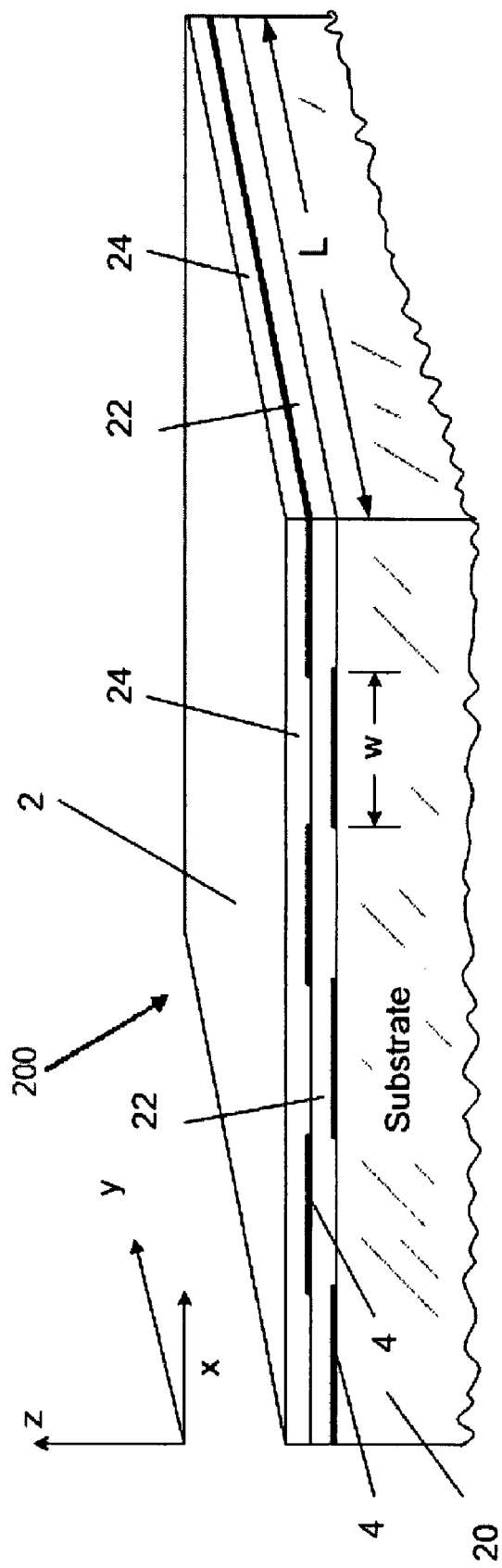
FIG. 2 shows an exemplary cross sectional segment of the windshield from FIG. 1, in accordance with the principles of the present invention.

FIG. 2 shows an exemplary cross sectional segment of the windshield from FIG. 1, in accordance with the principles of the present invention.

For simplification, the cross sectional segment 200 shows only six (6) electrodes 4 from the electrode array 2. The cross sectional segment 200 can further comprise a substrate 20, a first insulating layer 22, a second insulating layer 24, and thin electrodes 4 located at the layer boundaries as indicated. With an automotive application for the fluid movement apparatus 100, the substrate 20 can comprise automotive glass and automotive plastics.

The substrate 20 may be either the insulating surface where the fluid would normally collect or it may be a thin insulator that can be attached to an insulating surface or non-insulating surface. The adjacent electrodes 4 alternate in location as indicated between the first insulating layer 22 and the second insulating layer 24. Every other electrode 4 is laid directly on the substrate 20 within the first insulating layer 22. Above the first insulating layer 22 can be located the second insulating layer 24. The electrodes 4 in the second insulating layer 24 can be spaced to alternately cover the windshield 110 with electrodes 4 as indicated. To assist in removal of fluid from the windshield 110, the second insulating layer 24 can be made from a hydrophobic material.

In this example, the spacing between adjacent electrodes 4 has a vertical component, but a zero lateral component. In practice it may be possible to alter these separation components depending on the applied voltages and particular application.

Figure 3:
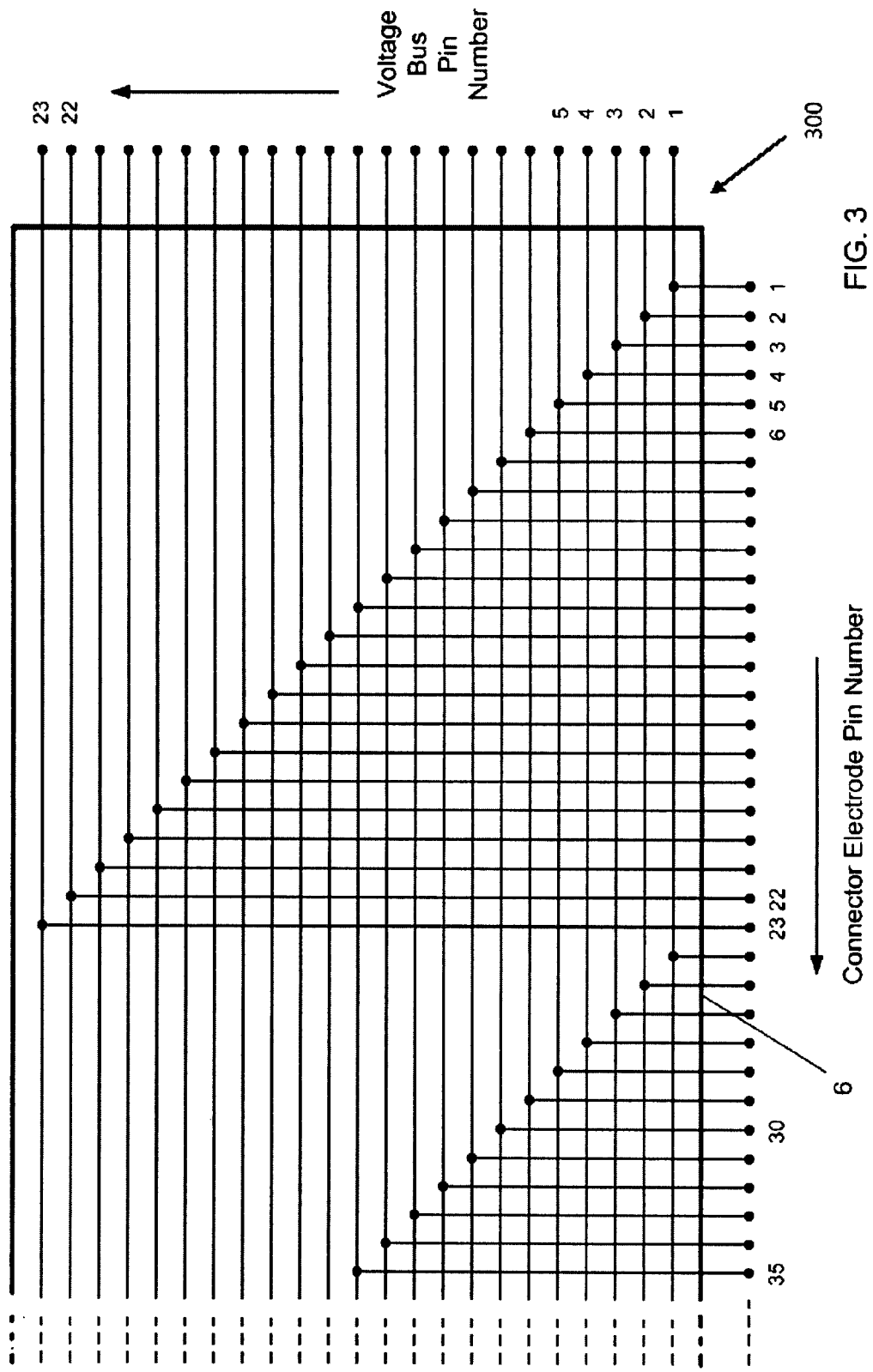
FIG. 3 illustrates an exemplary pin configuration in which electrodes are connected to individual pins of a voltage bus, in accordance with the principles of the present invention.

FIG. 3 illustrates an exemplary pin configuration in which electrodes are connected to individual pins of the voltage bus, in accordance with the principles of the present invention.

In particular, exemplary pin configuration 300 can include m voltage bus pins, m being arbitrarily selected as 23. Likewise pin configuration 300 can include n electrodes 4, where n is usually quite large, but where only the first thirty-five (35) electrodes 4 being illustrated for simplicity of illustration.

As shown, any single pin from DC voltage bus 8 can be connected to a plurality of electrodes 4 within an electrode array 2. In this manner the number of pins within the DC voltage bus 8 can be kept to a minimum while activating a plurality of electrodes 4.

In this example, pin number 1 can be connected to two electrodes 4 within an electrode array 2, electrode 4 number 1 and electrode 4 number 24. Likewise, pin number 2 can be connected to two electrodes 4 within an electrode array 2, electrode 4 number 2 and electrode 4 number 25. Although the individual pins within the DC voltage bus 8 are shown to be connected to two electrodes 4 each, any individual pin can be connected to any number of electrodes 4 within an electrode array 2 to activate a plurality of electrodes 4 simultaneously.

Figure 4:
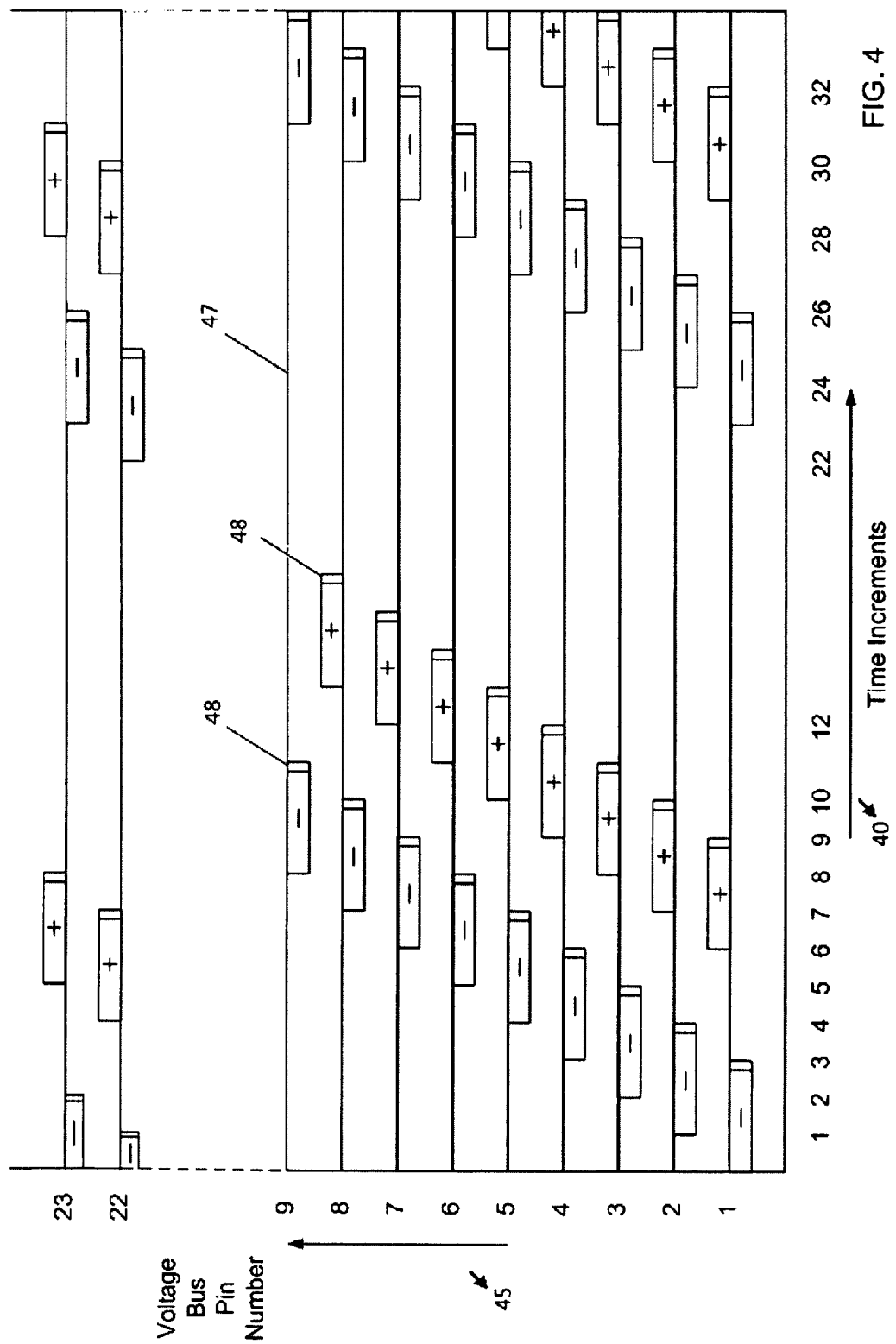
FIG. 4 shows an example of voltage changes in time for each pin of a DC voltage bus, in accordance with the principles of the present invention.

FIG. 4 shows an example of voltage changes in time for each pin of a DC voltage bus, in accordance with the principles of the present invention.

In particular, FIG. 4 shows the voltages applied to each pin of the voltage bus 8 as a function of time. Time is represented along the horizontal axis 40 in increments where each increment is $\Delta t$ seconds in length of time. Individual pins, e.g., 23 pins in FIG. 4, from the voltage bus 8 are represented along the vertical axis 45.

Each pin from the voltage bus 8 may be either (a) unconnected or connected to (b) the positive voltage terminal, (c) the negative voltage terminal, or (d) the common connector. The unconnected state is indicated by the horizontal zero line 47. The positive connection is indicated by the (+) interval and the negative connection by the (−) interval.

The short interval 48 indicated by the two vertical lines at the end of each charged interval indicates connection to the common connector. If, for example, we consider the time increment number 9, we see that pin numbers 1, 2, and 3 are receiving a positive voltage, whereas, pins number 7, 8, and 9 are receiving a negative voltage. Pins 4, 5, and 6 are unconnected. Also at the end of increment number 9 we see that pins 1 and 7 are briefly connected to the common connector. Hence pins 1 and 7 are connected to each other. If pin 7 has a negative charge and pin 1 has a positive charge at time increment 7, charges will flow between pins 1 and 7 to neutralize the electrodes 4 connected to these pins. In this manner, an electric field is created between pins 2 and 10.

Figure 5A:
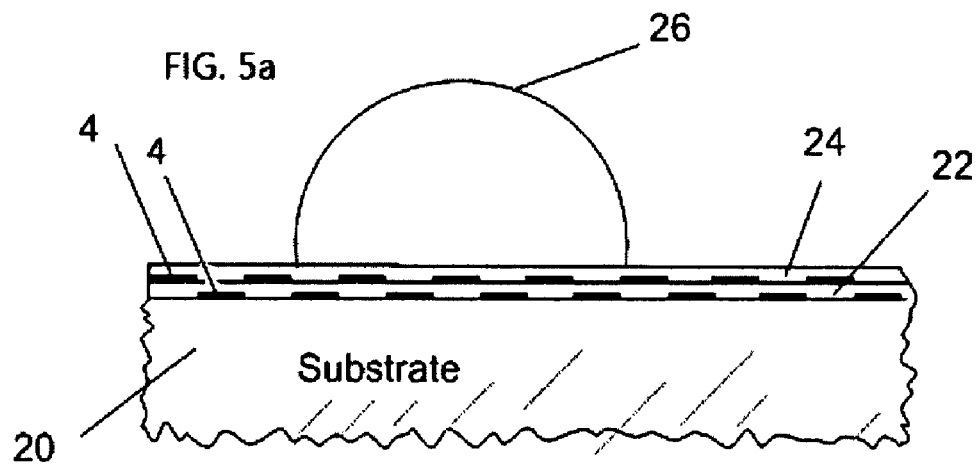
FIGS. 5*a*-5*c* illustrate how electric fields between electrodes are used to apply forces to and move a liquid, in accordance with the principles of the present invention.
Figure 5B:
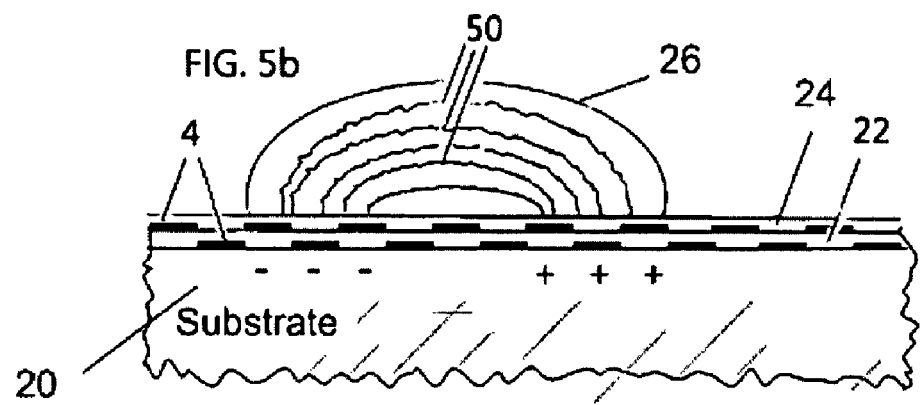
Figure 5C:
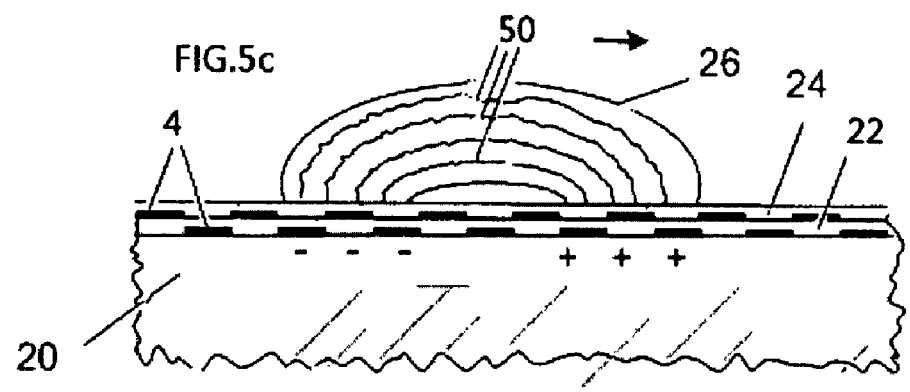

FIGS. 5*a*-5*c* illustrates how electric fields between electrodes are used to apply forces to and also move a liquid.

In particular, FIG. 5a shows an exemplary cross sectional segment of the windshield 110 with a droplet of fluid 26 on top of the electrode array 2 as indicated. The droplet of fluid 26 is undisturbed, as the electrode array 2 has not been activated within the figure to exert a force on the droplet of fluid 26.

FIG. 5b shows how the droplet of fluid 26 is attracted to individual electrodes 4 within the electrode array 2 when voltages are applied to six (6) of the electrodes 4. Positive voltages are indicated by the (+) symbol and negative voltages by the (−) symbol. The electrical connection to these electrodes can be accomplished with connector 6 from FIG. 1. As shown, an electric field 50 can be generated in the fluid droplet 26 by the voltage differences between the positively charged (+) electrodes 4 and the negatively charged (−) electrodes 4. The electric field 50 will strongly attract the droplet of fluid 26 against the second insulating layer 24 as indicated.

FIG. 5c shows the movement of the droplet of fluid 26 after the voltage to one (−) and one (+) electrodes 4, each in the farthest left position, is disconnected and the voltage to one (−) and one (+) electrodes 4, each in the farthest right position, are turned on. As a result, the droplet of fluid 26 experiences electric forces which move the droplet of fluid 26 to a new position directly above the charged electrodes 4 as indicated. By continuing to turn electrode voltages off and on in this manner, the droplet of fluid 26 can we can continuously moved to the right. Not shown in FIGS. 5b and 5C, is that each electrode, after it is turned off, is briefly connected to a neutral line so as to allow its charge to be neutralized.

The droplet of fluid 26 can also be moved back and forth to produce a scrubbing motion. As described above, the droplet of fluid 26 can be moved to the right. Thereafter, the order of which the electrodes 4 are turned on and off is reversed to move the droplet of fluid 26 to the left. Continuing to move the droplet of fluid 26 back and forth can produce a scrubbing action against the surface of the windshield 110 to assist in cleaning debris from the windshield 110.

Figure 6:
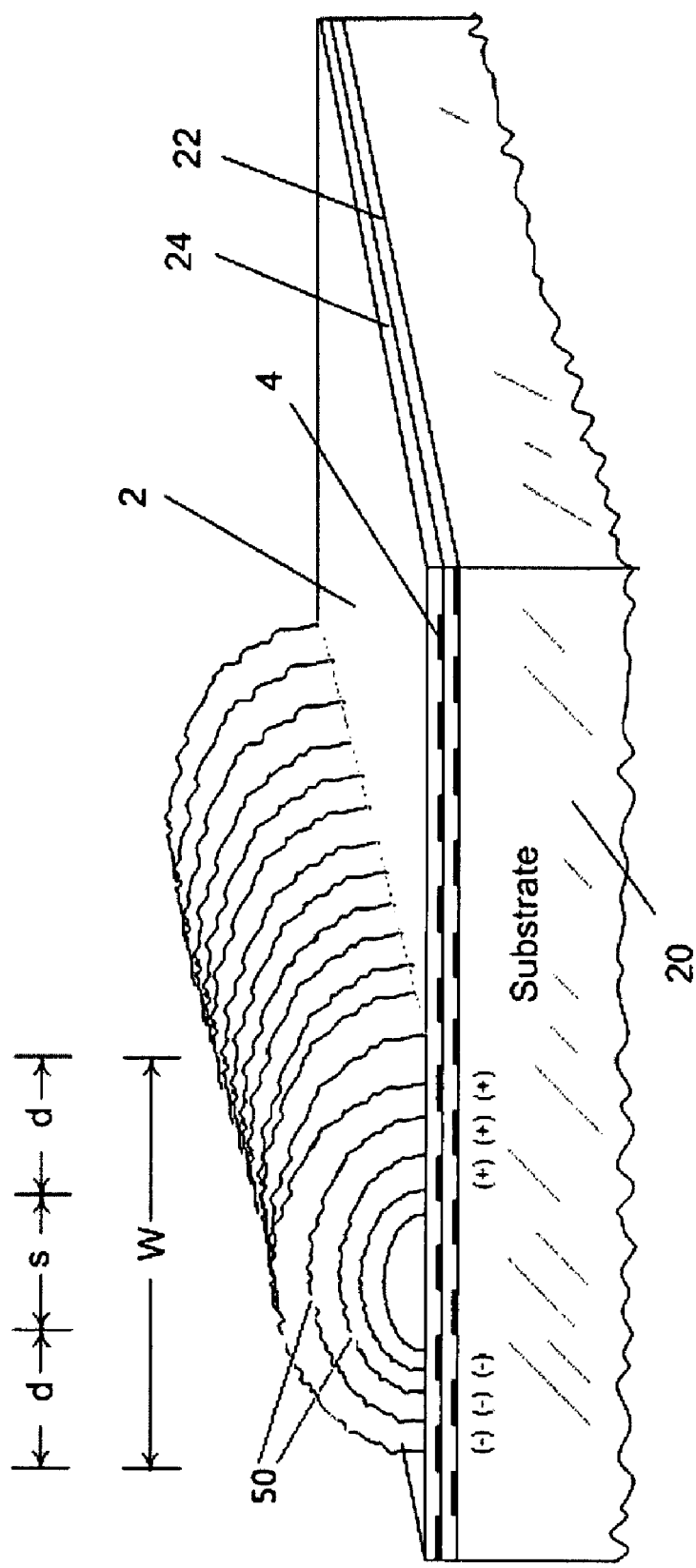
FIG. 6 illustrates a segment of a cylindrical fringe electric field that can be formed with an electrode array, in accordance with the principles of the present invention.

FIG. 6 illustrates a segment of a cylindrical fringe electric field that can be formed with an electrode array, in accordance with the principles of the present invention.

In particular, FIG. 6 illustrates a three dimensional view of a cylindrical pattern of electric field 50 that can be formed through activation of electrodes 4 of a windshield 110.

The cylindrical electric field 50 can be moved along a windshield 110 after the voltage to one (−) and one (+) electrodes 4, each in the farthest left position, is disconnected and the voltage to one (−) and one (+) electrodes 4, each in the farthest right position, are turned on (as shown in FIGS. 5b and 5c). The cylindrical electric field 50 can collect fluid as it moves across a windshield 110. As fluid is collected, it will collect in the same cylindrical volume as the electric field 50. Strong surface tension forces of a fluid will draw the fluid into a cylindrical type shape.

Figure 7:
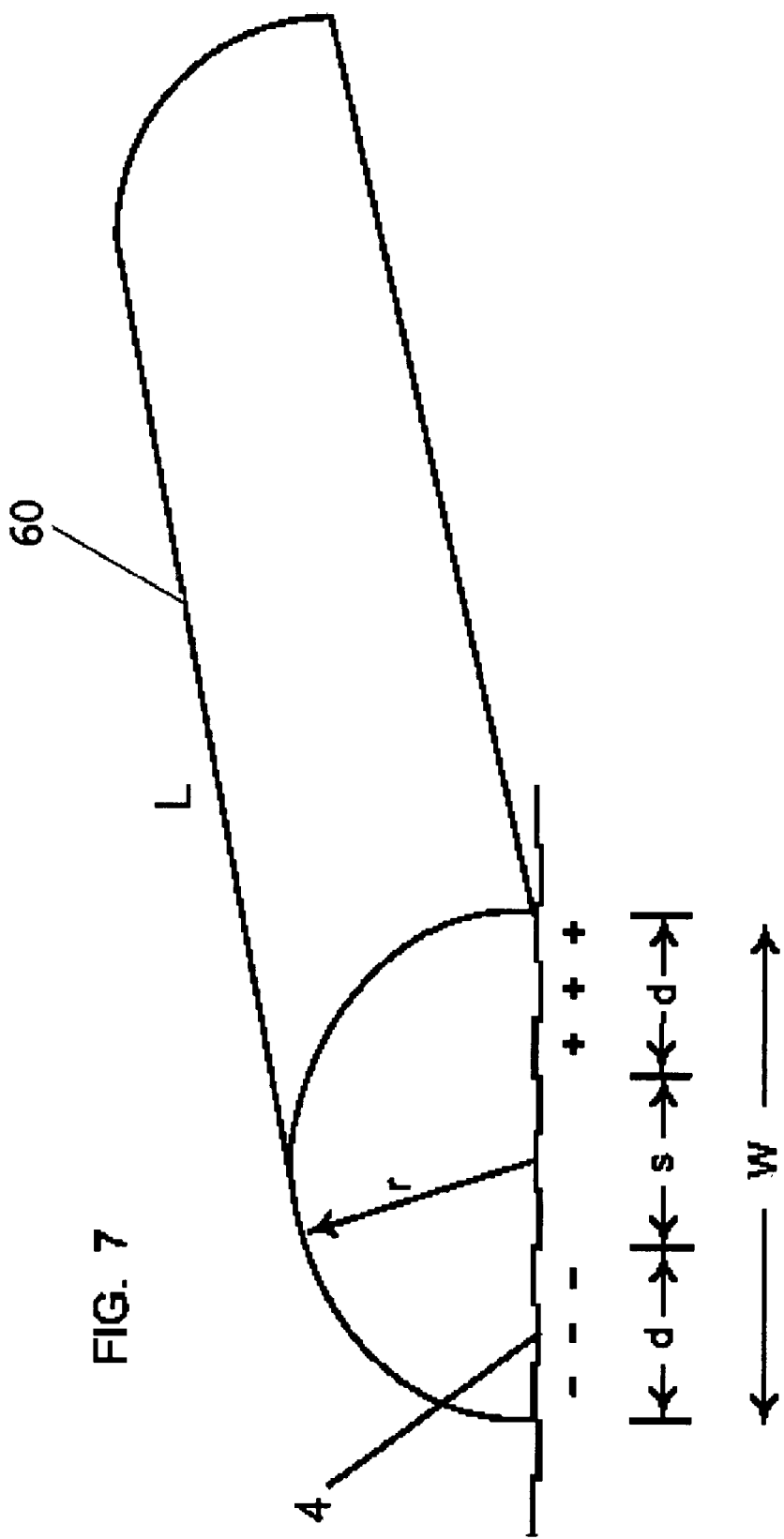
FIG. 7 depicts a 3-dimensional cylindrical column of fluid as it is held in place by a fringe electric field, in accordance with the principles of the present invention.

FIG. 7 depicts a 3-dimensional cylindrical column of fluid 60 as it is held in place by a fringe electric field, in accordance with the principles of the present invention.

In particular, FIG. 7 shows a cylindrical volume of fluid 60 collected, but without showing the electric field 50 and other components of the electrode array 2. A plurality of droplets of fluid are attracted to individual electrodes 4 within the electrode array 2 when voltages are applied to six (6) of the electrodes 4 to form a cylindrical electric field pattern 50. As shown, an electric field 50 can be generated in the cylindrical column of fluid 60 by the voltage differences between the positively charged (+) electrodes 4 and the negatively charged (−) electrodes 4. The electric field 50 will strongly attract the cylindrical column of fluid 60 against the second electrode layer 24 as indicated. The radius of the cylinder is designated as r and the length is designated as L. The electrical forces acting on a cylinder of fluid can be estimated. A pair of coplanar adjacent, flat, and thin conductors of width d and separated by a distance s can act as a capacitor whose capacitance is dependent on the ratio d/s and the electrode length L. In this example, d and s can be equal to 3 w.

Thus, by increasing the ratio d/s, the capacitance can be increased and, hence, the effectiveness of the fluid movement apparatus 100. However, a lower limit exists for the magnitude of s in that the breakdown electric field 50 intensities of the fluid movement apparatus 100 cannot be exceeded. The breakdown voltage is dependent on the breakdown voltages of each of the insulating layers. The electric field intensity E is approximately proportional to V/s, where V is the operating DC voltage. Electric forces 50 that tending to move a fluid across the electrodes 4 can be shown to be proportional to the ratio $V^2/s$ times the electrode length L.

The gravitational force on the cylindrical column of fluid 60 is simply the product of its mass with the gravitational constant g. The mass of the cylinder of fluid 60 (where d and s are identical) is simply proportional to $s^2$ times the electrode length L.

Thus, the ratio of electric force $F_e$ to a gravitational force $F_g$ can be calculated as varying as $V^2/s^3$. But since V/s is approximately the electric field E, this can be rewritten as $E^2/s$. If the electric field intensity E were limited to the breakdown voltage of air (approximately 3 volts per micron or 75 volts per mil), then this ratio becomes simply 0.128/s in mks units. Hence, for various s (in microns) we have:

| S | $F_e/F_g$ |
|---|---|
| 25μ | ~1000 |
| 250μ | ~100 |
| 2500μ | ~10 |
| 25000μ | ~1 |

$F_e/F_g$ ratios of 10 or more are preferable to rapidly accelerate a fluid at a sufficient rate over a surface. This corresponds to an s value of 2500 microns or 100 mils, and a wiper width of ~300 mils for our current example. For an s of 100 mils and an electric field intensity of 75 volts per mil, the result would be a DC voltage of 75×100 or 7500 volts. If we opted to operate at an s value of 10 mils, then the DC voltage would be 750 volts. It is important to note that for dimensions of this order and smaller, surface tension forces play an important role in the dynamics and shape of the fluid volume.

Figure 8:
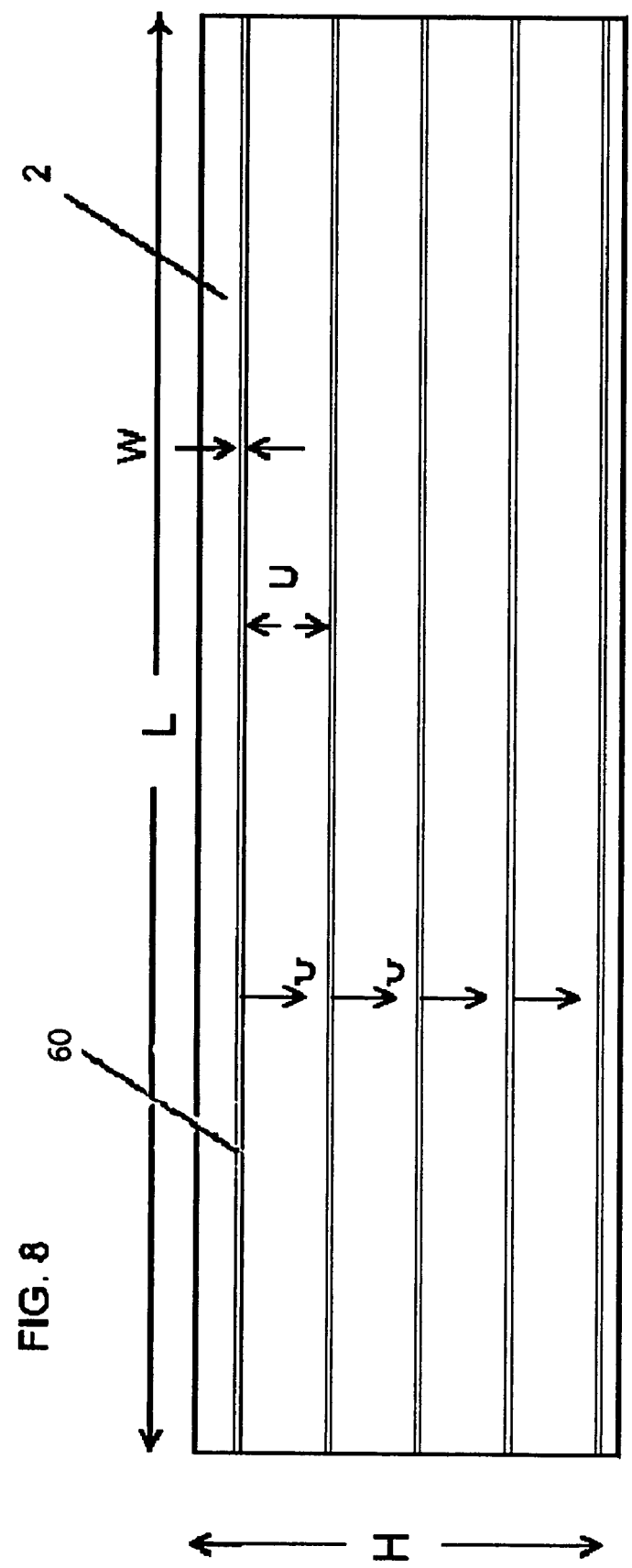
FIG. 8 illustrates how cylinders of fluid move down an area to be cleared of fluid, in accordance with the principles of the present invention.

FIG. 8 illustrates how cylinders of fluid move down an area to be cleared of fluid, in accordance with the principles of the present invention.

In particular, FIG. 8 illustrates how cylinders of fluid 60 move down an area to be cleared of fluid. The cylinders of fluid 60, which can obscure vision in a manner similar to a conventional wiper blade, are preferably very narrow and move downward at a velocity (v), so they will tend not to be noticeable. Preferably, the cylinders of fluid 60 will occupy perhaps 5% or less of an area to be cleared of fluid. With an array of electrodes 2 with a transparency of approximately equal to 96%, the resultant total transparency would be approximately equal to (0.96)(0.95)=0.91 or 91%. In applications where visibility is of less importance or not important at all, the cylinders of fluid 60 can occupy a much larger percentage of an area to be cleared of fluid to more efficiently move a fluid there across.

While FIG. 8 shows only five cylinders of fluid 60 for illustrative purposes, in general the number of cylinders of fluid may be considerably larger. Hence U, the distance between the cylinders of fluid 60, would be much smaller, and correspondingly the width W of the individual cylinders of fluid.

The rate of fluid removal is proportional to $vW^2 L/U$. The velocity v is a product of a switching rate multiplied by an electrode 4 width w. Hence, values for v, W, and U can be chosen to enable fluid to be removed at a rate equal to a rate at which fluid collects on a windshield 110 of one square meter area in a hard rain, which can be as much as ten cubic centimeters per second or 36 liters per hour.

In a preferred embodiment, a force ratio of $F_e/F_g=100$ is needed in order to adequately move a fluid. According to the table above, this would result in an s=250 microns or 10 mils. Using the electrode configuration of FIG. 6, results in a d=10 mils. This results in a wiper width W of 30 mils. Given an s region that is comprised of three (3) electrodes, an electrode 4 of w of 10/3=3.33 mils is required. For the operating field intensity of 75 volts per micron, a voltage of 10×75=750 volts is required. Between the negative electrode to the left of the neutral region s and the positive electrode to the right of the region s, there are 4 areas in which the first insulator layer 22 is crossed and for electrical breakdown to occur. Hence, for a 750 operating voltage the first insulating layer 22 can have a breakdown voltage of greater than 750/4=187.5 volts.

Many other voltage configurations for electrodes 4 are possible than those illustrated herein. For example, a voltage configuration of (− − n + +) implies a width of w=10 mils and W=50 mils. Selected electrodes 4 can be adjacent (i) positively charged electrodes, (j) unconnected electrodes and (k) negatively charged electrodes (l) unconnected electrodes where i, j, k, l are integers.

For any particular design it must be confirmed that the electrode 4 width, wiper width, switching frequency, velocity, etc. are sufficient for the required rate of fluid movement. For example velocity v, switching cycles per second f, and electrode 4 width w, are related by v=fw. Switching frequency is proportional to 1/RC, where R is the electrode 4 resistance and C is the relevant capacitance. Thus, the R and C values can be chosen to allow the needed switching frequencies.

While the teachings have been described with reference to exemplary embodiments for moving a fluid downward across a windshield, one of ordinary skill in the art would recognize that the teachings disclosed herein can be applied to movement of a fluid within any direction across a windshield. For example, at high speeds with wind pushing fluid against the windshield the fluid can be directed either upward or sideways to avoid combating the forces of the resultant wind. The switch from directing the fluid from a downward direction to an alternate direction can be made automatic by the disclosed computer with a reading of a vehicles speed data.

While the teachings have been described with reference to exemplary embodiments for moving a fluid across a windshield, one of ordinary skill in the art would recognize that the present teachings can be applied to movement of a fluid across any flat surface. For example, the teachings disclosed herein can be applied to any of the windows of an automobile and are not limited to a windshield, thus it include headlights, mirrors, and other windows. These teachings can also be applied to other structures such as, optical lenses, solar arrays, periscopes, and windows of buildings, etc.

While the teachings have been described with reference to exemplary embodiments for moving a fluid across a windshield, one of ordinary skill in the art would recognize that the present teachings can be applied to transporting a fluid onto a windshield or other surface. For example, a cleaning fluid can be transported onto a windshield for cleaning purposes.

While the teachings have been described with reference to exemplary embodiments for moving a fluid across a windshield without the use of a mechanical windshield wiper system, the teachings disclosed herein can be used in combination with a mechanical windshield wiper system to remove fluid or other articles from a windshield, either exclusively or together.

While the invention has been described with reference to the exemplary preferred embodiments thereof, those skilled in the art will be able to make various modifications to the described embodiments of the invention without departing from the true spirit and scope of the invention.

What is claimed is:

1. Moving electric field windshield wiper apparatus, comprising:
    first, second, third, and fourth parallel electrodes disposed beneath a windshield outer surface in a direction substantially parallel to a windshield longitudinal axis;
    connecting structure configured to supply DC voltage to said first, second, third, and fourth parallel electrodes; and
    processing structure, coupled to said connecting structure, and configured to (i) form a cylindrical electric field substantially parallel to the windshield longitudinal axis and outside the windshield outer surface, by causing the first electrode to be supplied with positive DC voltage, causing the second electrode to be neutral, and causing the third electrode to be supplied with negative DC voltage, said cylindrical electric field being configured to entrain water, and (ii) move the formed cylindrical electric field in a first direction substantially perpendicular to said electrodes by causing the second electrode to be supplied with positive DC voltage, causing the third electrode to be neutral, and causing the fourth electrode to be supplied with negative DC voltage.

2. Apparatus according to claim 1, further comprising a hydrophobic layer disposed above said first, second, third, and fourth parallel electrodes.

3. Apparatus according to claim 1, further comprising pluralities of further parallel electrodes disposed beneath the windshield outer surface in the direction substantially parallel to the windshield longitudinal axis, wherein said connecting structure is configured to supply DC voltage to said plurality of further parallel electrodes, and wherein said processing structure is configured to form a plurality of further cylindrical electric fields substantially parallel to the windshield longitudinal axis and outside the windshield outer surface, by causing a first plurality of further electrodes to be supplied with positive DC voltage, causing a second plurality of further electrodes to be neutral, and causing a third plurality of further electrodes to be supplied with negative DC voltage.

4. Apparatus according to claim 3, wherein said processing structure is configured to form said plurality of further cylindrical electric fields such that all cylindrical electric fields occupy less than about ten percent of the windshield outer surface.

5. Apparatus according to claim 1, wherein said processing structure is configured to simultaneously cause (i) three adjacent electrodes to be supplied with positive DC voltage, and (ii) three different adjacent electrodes to be supplied with negative DC voltage.

6. Apparatus according to claim 1, wherein said processing structure is configured to subsequently move the formed cylindrical electric field in a direction substantially opposite to said first direction, by subsequently causing the first electrode to be supplied with positive DC voltage, causing the second electrode to be neutral, and causing the third electrode to be supplied with negative DC voltage.

7. Apparatus according to claim 1, wherein said processing structure is detachably coupled to said connecting structure.

8. Apparatus according to claim 1, wherein said cylindrical electric field has an electric force $F_e$, wherein a gravitational force on the water entrained in said cylindrical electric field is $F_g$, and wherein said processing structure is configured to provide DC voltage to said first and third electrodes such that the ratio $F_e/F_g$ is greater than or equal to about ten.

9. Apparatus according to claim 8, wherein said processing structure is configured to provide DC voltage to said first and third electrodes such that the ratio Fe/Fg is substantially 100.

10. Apparatus according to claim 1, wherein said processing structure is configured to provide substantially 750 volts DC to said first and third electrodes.

11. Apparatus according to claim 1, wherein the entrained water comprises rainwater.

12. Apparatus according to claim 1, wherein the first, second, and third electrodes and the water provide a capacitance.

13. Apparatus according to claim 12, wherein, when the processing structure causes second electrode to be supplied with positive DC voltage, causes the third electrode to be neutral, and causes the fourth electrode to be supplied with negative DC voltage, the capacitance moves causing the entrained water to move.

14. Apparatus according to claim 1, wherein the first, second, third, fourth, fifth, sixth, seventh, eighth, and ninth electrodes and the water provide a capacitance.

15. Apparatus according to claim 14, wherein, when the processing structure causes the second, third, and fourth electrodes to be supplied with positive DC voltage, causes the fifth, sixth, and seventh electrodes to be neutral, and causes the eighth, ninth, and tenth electrodes to be supplied with negative DC voltage, the capacitance moves causing the entrained water to move.

16. Moving electric field windshield wiper apparatus, comprising
   first, second, third, and fourth parallel electrodes disposed beneath a windshield outer surface in a direction substantially parallel to a windshield longitudinal axis;
   connecting structure configured to supply DC voltage to said first, second, third, and fourth parallel electrodes; and
   processing structure, coupled to said connecting structure, and configured to (i) form a cylindrical electric field substantially parallel to the windshield longitudinal axis and outside the windshield outer surface, by causing the first electrode to be supplied with positive DC voltage, causing the second electrode to be neutral, and causing the third electrode to be supplied with negative DC voltage, said cylindrical electric field being configured to entrain water, and (ii) move the formed cylindrical electric field in a first direction substantially perpendicular to said electrodes by causing the second electrode to be supplied with positive DC voltage, causing the third electrode to be neutral, and causing the fourth electrode to be supplied with negative DC voltage,
   wherein said first and third electrodes are disposed in a lower layer, wherein said second and fourth electrodes are disposed in an upper layer, and wherein edges of said second electrode overlap edges of said first and third electrodes.

17. Apparatus according to claim 16, wherein said upper layer and said lower layer are separated by an insulation layer.

18. Apparatus according to claim 17, wherein insulation layer has a breakdown voltage of greater than about 187 volts.

19. Moving electric field windshield wiper apparatus, comprising:
   first, second, third, fourth, fifth, sixth, seventh, eighth, ninth, and tenth parallel electrodes disposed beneath a windshield outer surface in a direction substantially parallel to a windshield longitudinal axis;
   a detachable connector configured to couple DC voltage to a processing/switching structure; and
   the processing/switching structure processing structure, coupled to said connecting structure, and configured to (i) form a cylindrical electric field substantially parallel to the windshield longitudinal axis and outside the windshield outer surface, by causing the first, second, and third electrodes to be supplied with positive DC voltage, causing the fourth, fifth, and sixth electrodes to be neutral, and causing the seventh, eighth, and ninth electrodes to be supplied with negative DC voltage, said cylindrical electric field being configured to entrain water, and (ii) move the formed cylindrical electric field in a first direction substantially perpendicular to said electrodes by causing the second, third, and fourth electrodes to be supplied with positive DC voltage, causing the fifth, sixth, and seventh electrodes to be neutral, and causing the eighth, ninth, and tenth electrodes to be supplied with negative DC voltage.

20. Apparatus according to claim 19, wherein the entrained water comprises rainwater.

21. Moving electric field windshield wiper apparatus, comprising:
   first, second, third, fourth, fifth, sixth, seventh, eighth, ninth, and tenth parallel electrodes disposed beneath a windshield outer surface in a direction substantially parallel to a windshield longitudinal axis;
   a detachable connector configured to couple DC voltage to a processing/switching structure; and
   the processing/switching structure processing structure, coupled to said connecting structure, and configured to (i) form a cylindrical electric field substantially parallel to the windshield longitudinal axis and outside the windshield outer surface, by causing the first, second, and third electrodes to be supplied with positive DC voltage, causing the fourth, fifth, and sixth electrodes to be neutral, and causing the seventh, eighth, and ninth electrodes to be supplied with negative DC voltage, said cylindrical electric field being configured to entrain water, and (ii) move the formed cylindrical electric field in a first direction substantially perpendicular to said electrodes by causing the second, third, and fourth electrodes to be supplied with positive DC voltage, causing the fifth, sixth, and seventh electrodes to be neutral, and causing the eighth, ninth, and tenth electrodes to be supplied with negative DC voltage,
   wherein said first, third, fifth, seventh, and ninth electrodes are disposed in a lower layer, wherein said second, fourth, sixth, eighth, and tenth electrodes are disposed in an upper layer, and wherein edges of each electrode overlap edges of adjacent electrodes.

22. Apparatus according to claim 21, wherein said upper layer and said lower layer are separated by an insulation layer having a breakdown voltage of greater than about 187 volts, and further comprising a hydrophobic layer disposed above said electrodes.

23. A method of moving an electric field to wipe a windshield, comprising:
disposing first, second, third, and fourth parallel electrodes beneath a windshield outer surface in a direction substantially parallel to a windshield longitudinal axis;
supplying DC voltage to said first, second, third, and fourth parallel electrodes;
forming a cylindrical electric field substantially parallel to the windshield longitudinal axis and outside the windshield outer surface, by causing the first electrode to be supplied with positive DC voltage, causing the second electrode to be neutral, and causing the third electrode to be supplied with negative DC voltage, said cylindrical electric field being configured to entrain water; and
moving the formed cylindrical electric field in a first direction substantially perpendicular to said electrodes by causing the second electrode to be supplied with positive DC voltage, causing the third electrode to be neutral, and causing the fourth electrode to be supplied with negative DC voltage.

24. A method according to claim 23, further comprising:
disposing pluralities of further parallel electrodes beneath the windshield outer surface in the direction substantially parallel to the windshield longitudinal axis;
supplying DC voltage to said plurality of further parallel electrodes; and
forming a plurality of further cylindrical electric fields substantially parallel to the windshield longitudinal axis and outside the windshield outer surface, by causing a first plurality of further electrodes to be supplied with positive DC voltage, causing a second plurality of further electrodes to be neutral, and causing a third plurality of further electrodes to be supplied with negative DC voltage.

25. A method according to claim 24, further comprising:
moving all of the cylindrical electric fields in substantially the same direction.

26. A method according to claim 23, wherein the entrained water comprises rainwater.

27. A method according to claim 23, wherein, in the forming step, the first, second, and third electrodes and the water provide a capacitance.

28. A method according to claim 27, wherein, in the moving step, when the second electrode is supplied with positive DC voltage, the third electrode is neutral, and the fourth electrode is supplied with negative DC voltage, the capacitance moves causing the entrained water to move.

29. A method of moving an electric field to wipe a windshield, comprising:
disposing first, second, third, and fourth parallel electrodes beneath a windshield outer surface in a direction substantially parallel to a windshield longitudinal axis;
supplying DC voltage to said first, second, third, and fourth parallel electrodes;
forming a cylindrical electric field substantially parallel to the windshield longitudinal axis and outside the windshield outer surface, by causing the first electrode to be supplied with positive DC voltage, causing the second electrode to be neutral, and causing the third electrode to be supplied with negative DC voltage, said cylindrical electric field being configured to entrain water;
moving the formed cylindrical electric field in a first direction substantially perpendicular to said electrodes by causing the second electrode to be supplied with positive DC voltage, causing the third electrode to be neutral, and causing the fourth electrode to be supplied with negative DC voltage;
disposing said first and third electrodes in a lower layer;
disposing said second and fourth electrodes in an upper layer; and
causing edges of said second electrode to overlap edges of said first and third electrodes.

* * * * *